(12) United States Patent
Hagiwara

(10) Patent No.: US 6,704,272 B1
(45) Date of Patent: Mar. 9, 2004

(54) SPINDLE ROTATION DRIVING DEVICE WITH ALIGNING MEMBER AND AIR BEARINGS FOR ROTATING INFORMATION STORAGE DISKS

(75) Inventor: Hiroyuki Hagiwara, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 294 days.

(21) Appl. No.: 09/669,677

(22) Filed: Sep. 26, 2000

(30) Foreign Application Priority Data

Sep. 28, 1999 (JP) .......................................... 11-273569

(51) Int. Cl.$^7$ ............................................. G11B 25/04
(52) U.S. Cl. ....................................... 369/269; 369/263
(58) Field of Search ............................. 369/269; 310/51, 310/67 R, 90; 384/110; 360/98.01, 98.02, 98.03, 98.04, 98.05, 98.06, 98.07, 98.08

(56) References Cited

U.S. PATENT DOCUMENTS

| | | | | |
|---|---|---|---|---|
| 5,760,509 A | * | 6/1998 | Chung | 310/90 |
| 5,855,436 A | * | 1/1999 | Eum et al. | 384/110 |
| 5,920,443 A | * | 7/1999 | Ekhoff | 360/99.08 |
| 6,023,114 A | * | 2/2000 | Mori et al. | 310/90 |
| 6,127,756 A | * | 10/2000 | Iwaki et al. | 310/90 |
| 6,137,650 A | * | 10/2000 | Heine et al. | 360/98.07 |
| 6,366,552 B1 | * | 4/2002 | Oldermann et al. | 369/263 |

OTHER PUBLICATIONS

U.S. patent application Ser. No. 09/415,457 filed Oct. 14, 1999.

* cited by examiner

*Primary Examiner*—Tianjie Chen
(74) *Attorney, Agent, or Firm*—Fitzpatrick, Cella, Harper & Scinto

(57) ABSTRACT

A shaft which alternately stacks and holds disks and spacers is rotated by a motor having a rotor and stator. To prevent axial run-out during rotation, when the disks and spacers are fitted on the shaft, clean air is injected from an air pad to prevent eccentricity by a fluid film, and an aligning shaft is pressed against a hub on the upper end of the shaft via an air pad to attain alignment.

7 Claims, 6 Drawing Sheets

SPINDLE ROTATION DRIVING DEVICE WITH ALIGNING MEMBER AND AIR BEARINGS FOR ROTATING INFORMATION STORAGE DISKS

BACKGROUND OF THE INVENTION

1. Field of the Invention

The present invention relates to a spindle rotation driving device such as a spindle motor for rotating a plurality of information recording mediums stacked such as a hard disk, optical disk, optical card, and the like, an information recording/reproduction apparatus, and an information recording medium manufacturing method.

2. Related Background Art

An information recording/reproduction apparatus used in the manufacture, inspection, and the like of information recording mediums such as a hard disk, optical disk, optical card, and the like mounts a spindle rotation driving device such as a spindle motor or the like for rotating a plurality of disks which are stacked.

FIG. 6 shows a conventional spindle rotation driving device. A spindle portion 110 which stands upright on the surface of a base 101 of the information recording/reproduction apparatus holds a stack of a plurality of disks D, and is rotated by a motor $M_O$ disposed below the base 101.

The spindle portion 110 has a shaft 112 which is rotatably supported by a pneumatic bearing 111 fixed to the base 101. On the stationary side of the pneumatic bearing 111, a ring-shaped air pad 111a made up of a porous material and a pipe 111b for guiding clean air thereto are provided.

The plurality of disks D are stacked to sandwich a spacer S between neighboring disks D, and are clamped between a clamp 112a integrated with the shaft 112, and a hub 113 fastened to the upper end of the shaft 112.

The shaft 112 extends below the base 101 via a flange 112b disposed under the pneumatic bearing 111. A scale disk 115 of an encoder is mounted on the lower end of the shaft 112 and opposes an optical head 116.

A rotor 117 made up of a magnet integrated with the shaft 112, and a stator 119 consisting of a yoke 119a and coil 119b held by a motor housing 118 construct a motor which rotates the shaft 112. Note that the encoder is used in detection, control, and the like of the rotational speed of the motor.

Each spacer S is inserted to maintain parallelness of the disks D, and to suppress surface run-out upon rotation.

Upon fitting the disks D on the shaft 112, the central holes of the disks D are pressed against the shaft 112 alternately in opposing directions, so that the gaps formed between the shaft 112 and the central holes of the disks D are evenly distributed on the two sides of a rotation axis (spindle axis) O. In this way, dynamic unbalance caused by eccentricity of the disks D is suppressed.

Recently, an information recording apparatus is required to record large-size information, and therefore the recording densities and rotational speeds of recording mediums such as disks and the like are increasing. For this reason, smaller track pitches and strict management of track pitch errors are required. In order to meet such requirements, it is important to suppress not only synchronous and asynchronous vibrations but also eccentricity of each recording medium with respect to the spindle axis.

Compared to the required track pitch precision, the central hole of a disk as a recording medium has a very large hole diameter tolerance as standards, and eccentricity of a disk caused by this tolerance makes improvement in the track pitch precision difficult.

Any dynamic unbalance of the center of gravity upon rotating a disk causes whirling vibration, and vibrates not only the spindle axis but also a magnetic recording converter such as a magnetic head or the like via the base that fixes the motor at high rotational speed, thereby disturbing accurate alignment.

Furthermore, a stack of a large number of disks makes eccentricity correction of the disks harder, and enhances any already existing dynamic unbalance.

In the prior art, the surface run-out of each disk in the horizontal direction is suppressed using the spacer, but no mechanism for correcting any dynamic unbalance caused by eccentricity of each disk is added. For this reason, the disks are alternately pressed against the shaft to uniformly distribute gaps between the inner circumferential surfaces of the disks and the shaft, thus suppressing the dynamic unbalance. However, such measure maximizes the gap between each disk and the shaft, and the eccentricity amount of each disk becomes ½ the tolerance of the diameter of the central hole of the disk.

Upon building a system within a limited space, it is difficult for a single fluid bearing that rotatably supports the lower portion of the shaft to suppress vibrations of the distal end portion of the disk stack, as indicated by the broken line in FIG. 6.

SUMMARY OF THE INVENTION

The present invention has been made in consideration of the problems that remain unsolved of the prior art, and has as its object to provide a spindle rotation driving device which suffers less whirling vibrations due to a dynamic unbalance upon rotating a stack of recording mediums such as disks and the like, an information recording/reproduction apparatus, and an information recording medium manufacturing method.

In order to achieve the above object, a spindle rotation driving apparatus of the present invention comprises a spindle portion having a shaft for holding a stack of recording mediums, a first fluid bearing for rotatably supporting the spindle portion, a motor for rotating the spindle portion, an aligning member which is pressed against an upper end portion of the shaft in an axial direction, and a second fluid bearing for maintaining the aligning member in a non-contact manner with respect to the upper end portion of the shaft.

Preferably, the aligning member is coupled to a floating plate which is free to float or be chucked on a lift stage by a fluid pressure.

Preferably, an air pad for injecting fluid is provided on a cylindrical surface of the shaft, and eccentricity of the recording mediums fitted on the shaft is prevented by a fluid film formed by the fluid.

Preferably, air of the second fluid bearing is supplied from the first fluid bearing via an inner pipe of the shaft.

Preferably, air of the air pad of the shaft is supplied from the first fluid bearing via an inner pipe of the shaft.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Figure 1:
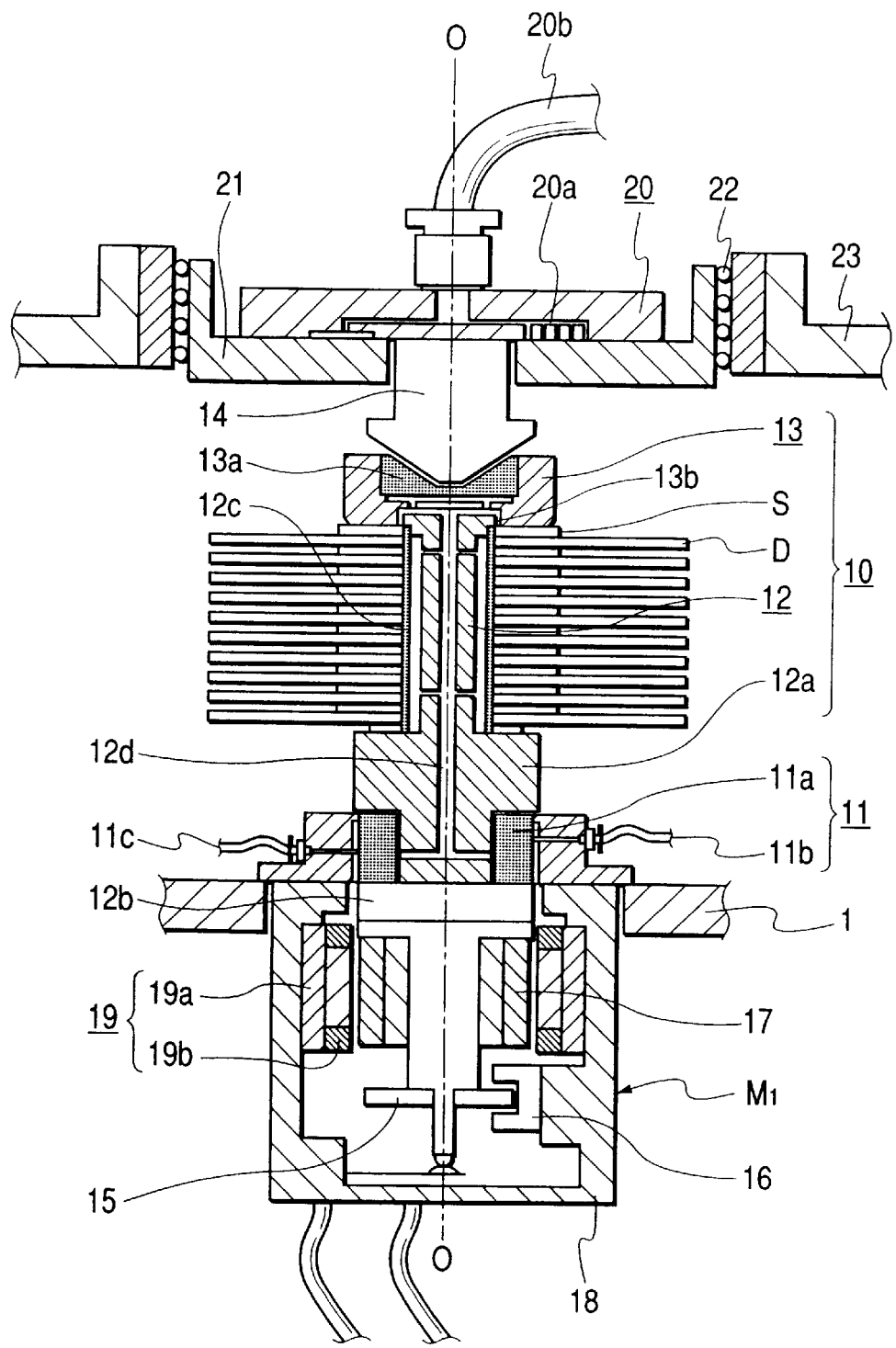
FIG. 1 is a sectional view showing a spindle rotation driving device according to an embodiment of the present invention.

FIG. 1 is a sectional view showing a spindle rotation driving device according to an embodiment of the present invention. A spindle portion 10 which stands upright on the surface of a base 1 and helds a stack of disks D as a plurality of recording mediums are rotated about a rotation axis (spindle axis) O by a motor $M_1$ which is provided under the base 1.

The spindle portion 10 has a shaft 12 which is rotatably supported by a pneumatic bearing 11 as a first fluid bearing fixed to the base 1. On the stationary side of the pneumatic bearing 11, a ring-shaped air pad 11a made up of a porous material and a pipe 11b for guiding clean air thereto are provided.

The plurality of disks D are stacked to sandwich a spacer S between neighboring disks D, and are clamped between a clamp 12a integrated with the shaft 12, and a hub 13 fastened to the shaft 12.

The hub 13 that forms the upper end portion of the shaft 12 has an air pad 13a which has an inverted conical recessed portion, and constructs a second fluid bearing which injects clean air from an inner pipe 13b that communicates with an inner pipe 12d of the shaft 12 and supports an aligning shaft 14 as an aligning member pressed against the recess portion of the air pad 13a in a non-contact manner.

The shaft 12 extends below the base 1 via a flange 12b disposed under the pneumatic bearing 11. A scale disk 15 of an encoder is mounted on the lower end of the shaft 12 and opposes an optical head 16.

A rotor 17 made up of a magnet integrated with the shaft 12, and a stator 19 consisting of a yoke 19a and coil 19b held by a motor housing 18 construct a motor which rotates the shaft 12. Note that the encoder is used in detection, control, and the like of the rotational speed of the motor.

Each spacer S is inserted to maintain parallelness of the disks D, and to suppress surface run-out upon rotation.

The shaft 12 has an air pad 12c made up of a porous material, and an inner pipe 12d for guiding clean air thereto. Clean air as fluid is supplied to the inner pipe 12d of the shaft 12 via a second pipe 11c provided to the pneumatic bearing 11.

The air pad 12c on the cylindrical surface of the shaft 12 is a cylindrical porous material having an outer diameter smaller by a very small amount than the diameters of the center holes of the disks D and spacers S fitted on the shaft 12.

Figure 2:
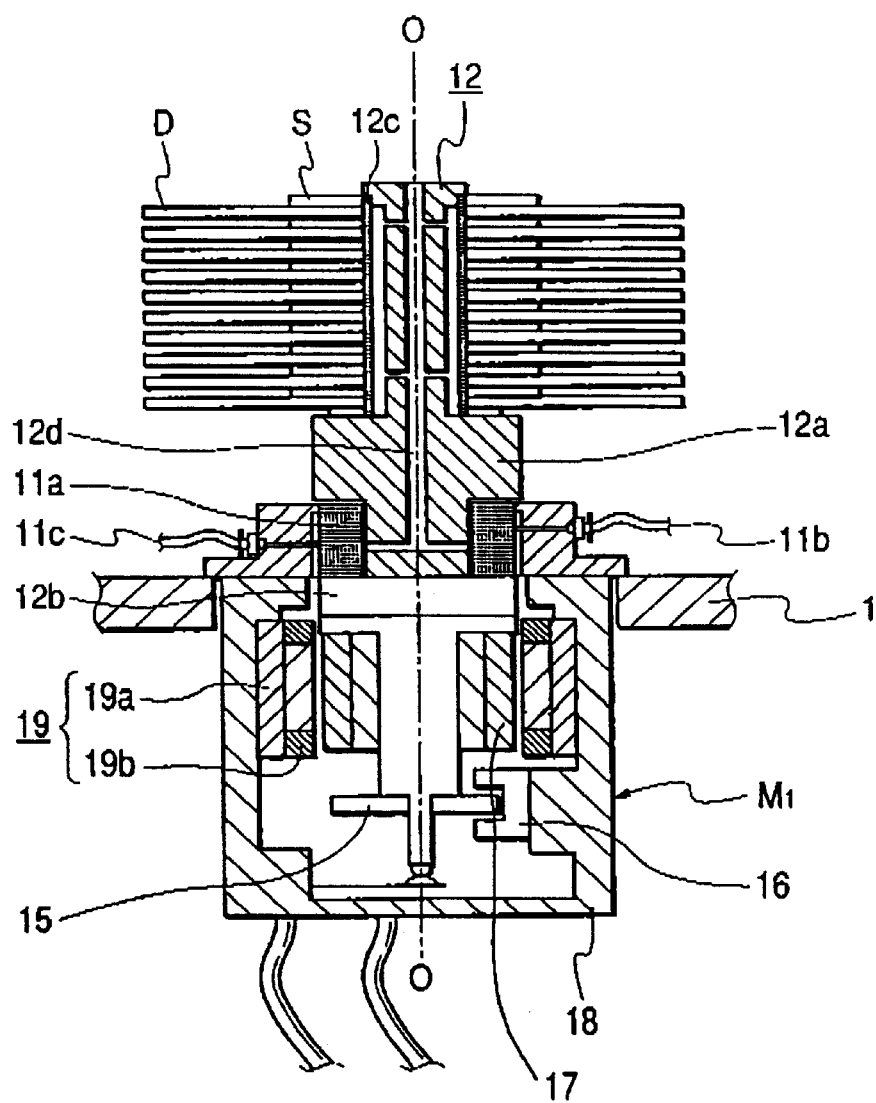
FIG. 2 is a sectional view showing a state wherein disks and spacers are attached to the device shown in FIG. 1.

Upon mounting the disks D and spacers S, as shown in FIG. 2, high-pressure air is supplied from the second pipe 11c, and is injected from the air pad 12c of the shaft 12. In this state, when the disks D and spacers S are fitted one by one from the upper end of the shaft 12, they self-align to the shaft 12 and clamp 12a by a fluid film formed by the air. In this manner, eccentricity of the disks D is prevented.

Figure 3:
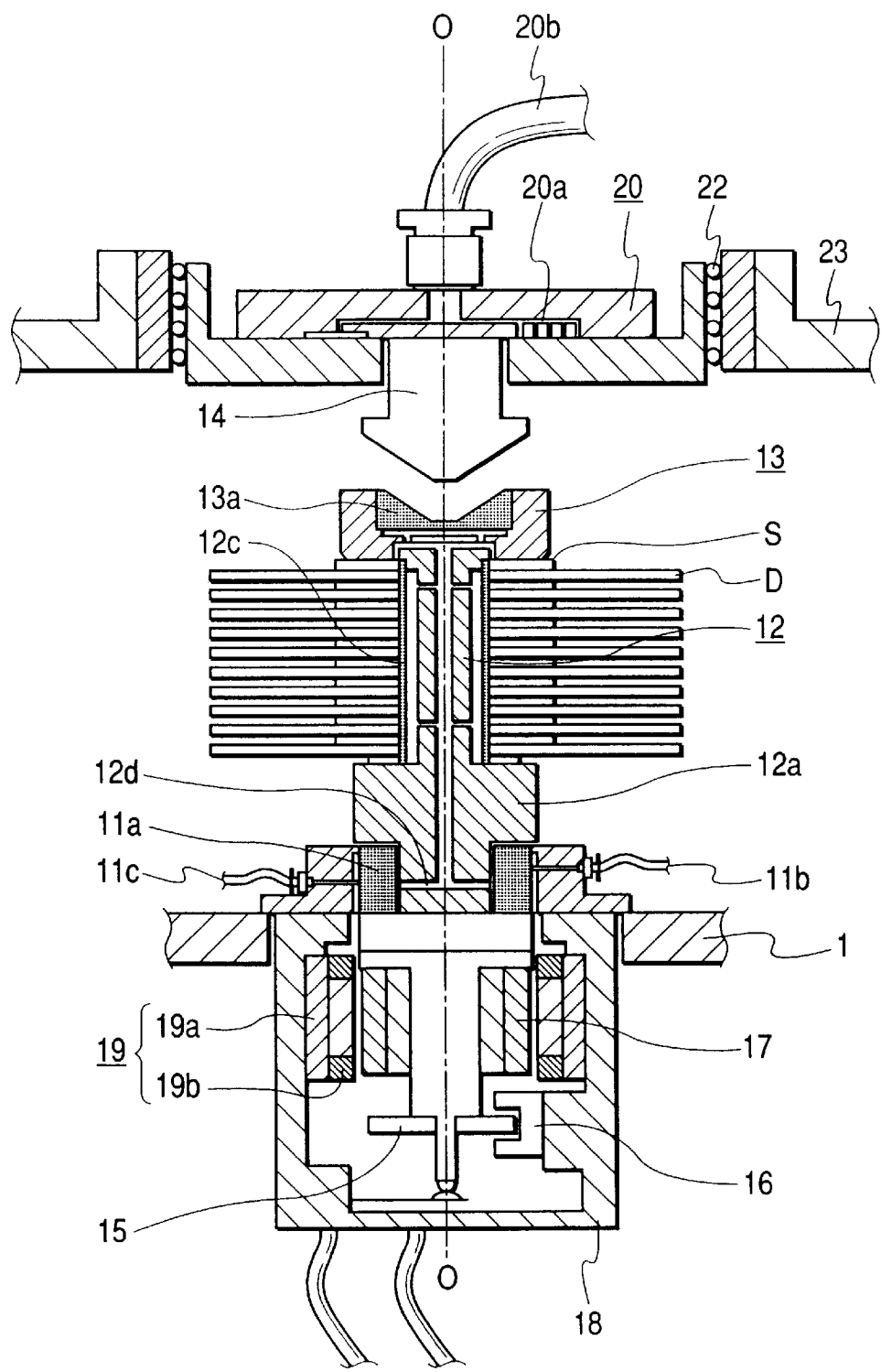
FIG. 3 is a sectional view showing a state wherein a hub is placed on the device shown in FIG. 2.

Then, the hub 13 for fixing the disks D is mounted, as shown in FIG. 3. In this state, the air pad 12c still injects high-pressure air. As described above, the hub 13 has the air pad 13a made up of a porous material, and has an inverted conical recessed portion, and is supplied with high-pressure air (clean air) from the inner pipe 12d of the shaft 12 via the inner pipe 13b of the hub 13.

Figure 4:
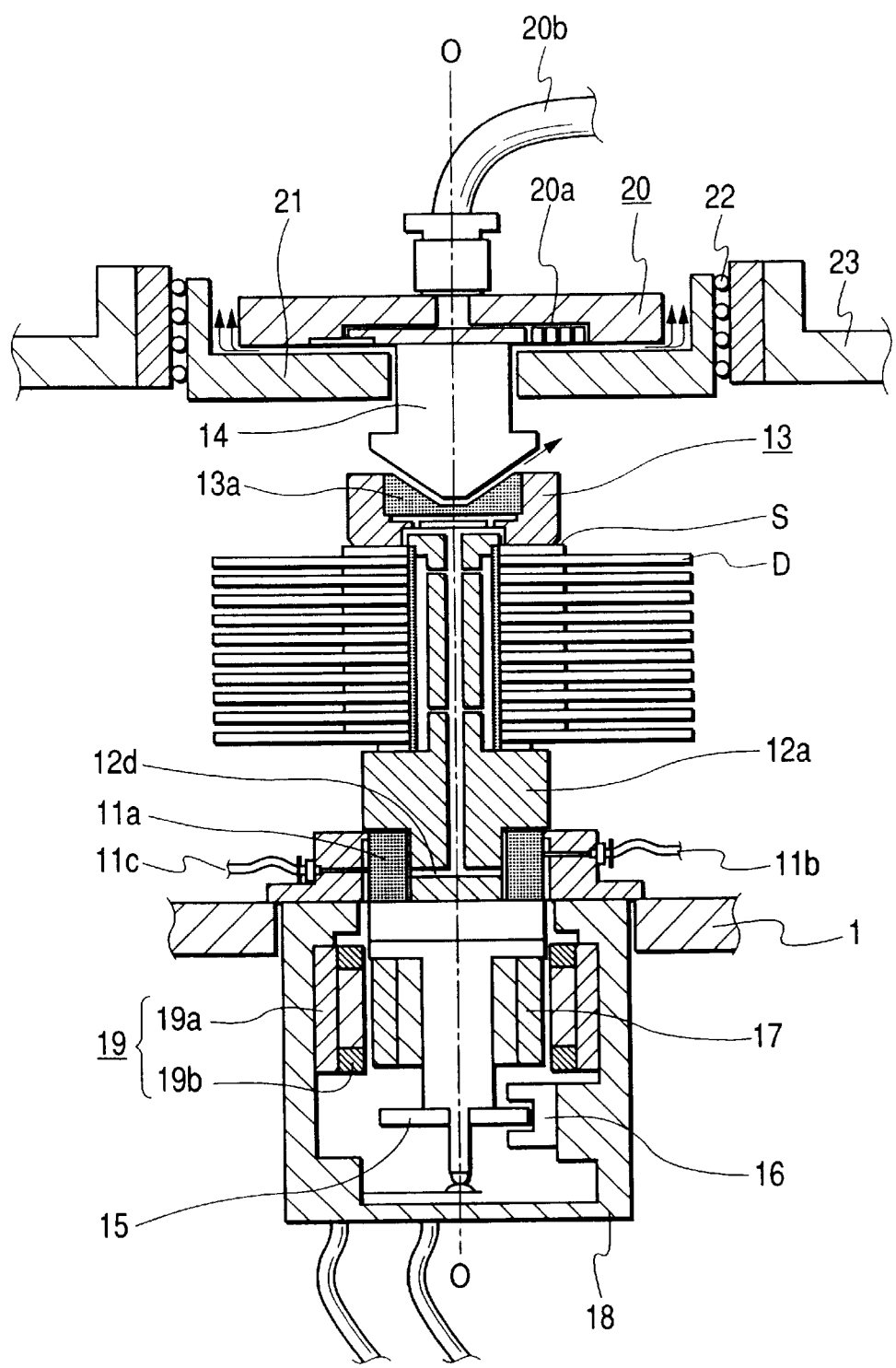
FIG. 4 is a sectional view showing a state wherein an aligning shaft of the device shown in FIG. 2 is moved downward.

Subsequently, as shown in FIG. 4, the aligning shaft 14 that fits into the central recessed portion of the air pad 13a of the hub 13 moves downward, and aligns the shaft 12 of the spindle portion 10 by pressing its upper end in the axial direction. The aligning shaft 14 is integrally attached to a floating plate 20, which has an inner pipe 20a, and floats or is chucked on a lift stage 21 by the fluid pressure of fluid supplied from a pipe 20b. The lift stage 21 is supported on an upper base 23 via a guide 22 to be vertically movable.

When the floating plate 20 is chucked on the lift stage 21 by suction, the state shown in FIG. 1 is obtained. In this state, the aligning shaft 14 maintains a non-contact state with the hub 13 by means of the air pad 13a, and axially presses the disks D, spacers S, and hub 13, which are mounted previously, to align them.

According to this embodiment, the disks and spacers held by the spindle portion of the spindle rotation driving device can be prevented from eccentricity due to the tolerance of the central holes of the disks and spacers by the fluid film formed by the air pad provided to the shaft when they are mounted on the spindle portion.

By preventing eccentricity due to the tolerance of the central holes of the disks and spacers in this way, a dynamic unbalance during disk rotation can be greatly reduced to avoid vibrations of the device, and the high-density and high-speed information recording can be achieved.

Furthermore, the shaft 12 is pressed in the axial direction in a non-contact state by the second fluid bearing comprising the aligning shaft 14 and the air pad 13a of the hub 13, thus making alignment for preventing whirling vibrations.

Since vibrations of the axial center of the spindle portion that holds the disks are effectively reduced, whirling vibrations due to dynamic unbalance can be further reduced, and a low-noise, high-performance information rebording/reproduction apparatus can be realized.

Figure 5:
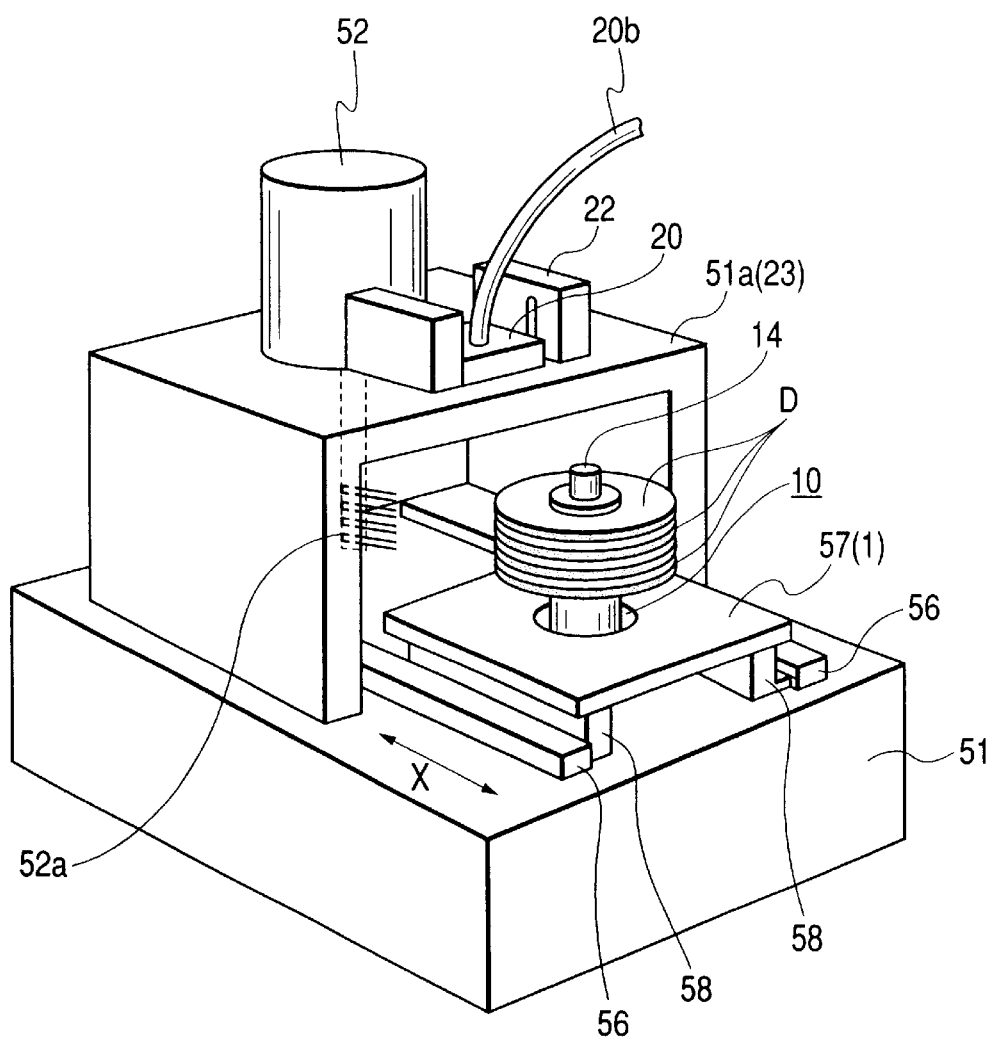
FIG. 5 is a perspective view showing the overall information recording/reproduction apparatus.
Figure 6:
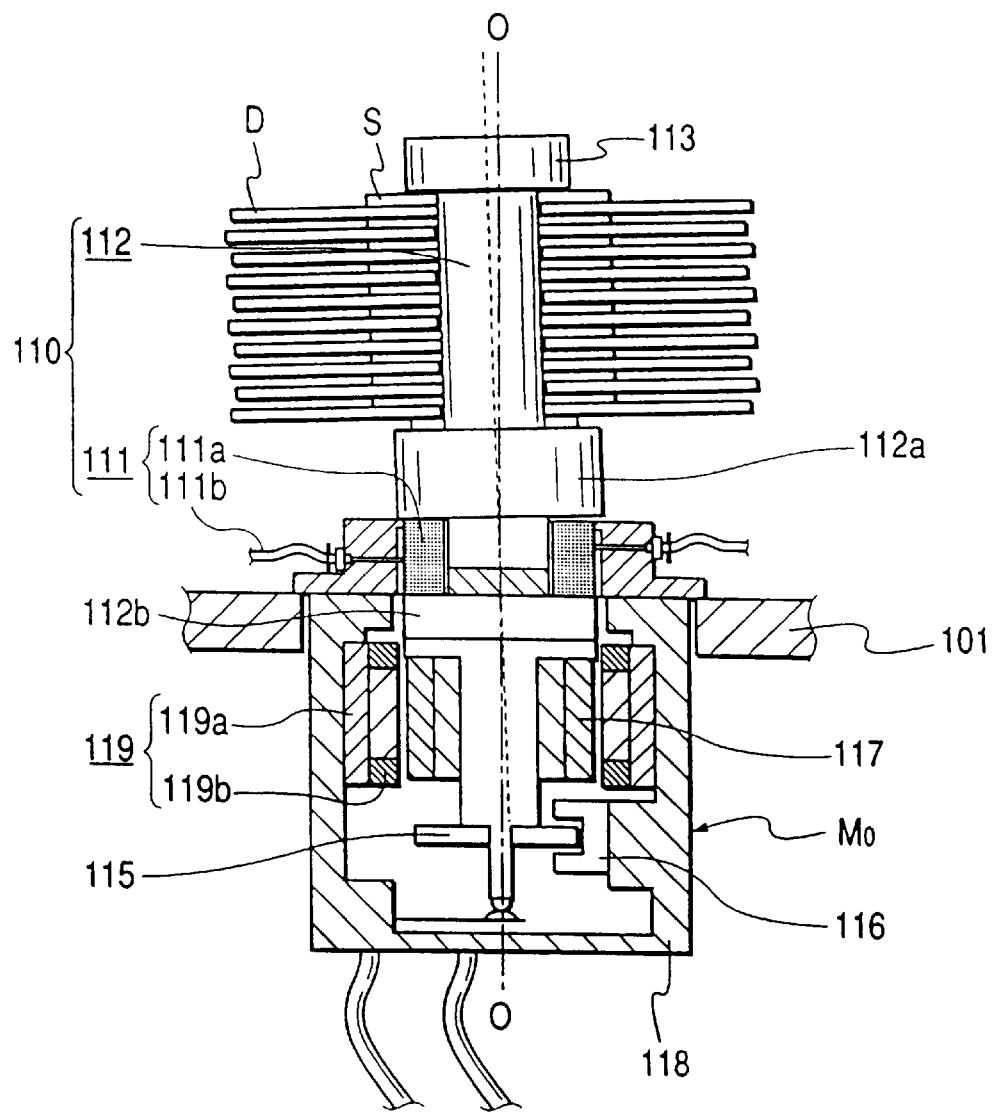
FIG. 6 is a sectional view showing a conventional spindle rotation driving device.

FIG. 5 shows the overall information recording/reproduction apparatus that mounts the aforementioned spindle rotation driving device. A column 51a that forms the aforementioned upper base 23 stands upright on a weighing table 51 made up of stone, metal, or the like.

A rotary alignment control device 52 is supported on the column 51a and a head stack unit 52a including a head stack as a stack of a plurality of recording/reproduction heads, and a carriage for holding these heads, is suspended from the column 51a. The rotary alignment control device 54 comprises a motor, an optical encoder serving as a sensor, and the like, and determines the rotation position of the head stack unit 52a about the rotary alignment axis perpendicular to the weighing table 51.

A pair of stationary guides 56 serving as guide means extending in the X-direction are fixed to the weighing table 51, and a movable guide 58 located under a moving stage 57 that forms the aforementioned base 1 fits in the stationary guides 6, thus allowing reciprocal movements of the moving stage 7 in the X-direction. A vacuum suction hole is formed on the back surface of the movable guide 58, which is fixed to the weighing table 51 after completion of movement. Upon moving the moving stage 57, a negative pressure is switched to a positive pressure to make the moving stage 57 slightly float.

A spindle rotation driving device comprising the spindle portion 10 having the spindle axis perpendicular to the weighing table 51, and the motor $M_1$ is mounted on the moving stage 57, and moves in the X-direction together with the moving stage 57. The moving stage 57 is driven in the X-direction by an air cylinder, and can be fixed at an arbitrary position on the stationary guides 56 by adjusting in advance the position of a movable stopper that can be manually adjusted. In this way, the spacing between the spindle portion 10 on the moving stage 57 and rotary alignment control device 54 is determined.

Upon exchanging the heads, the moving stage 57 is moved backward to move disks D to a position farthest from the rotary alignment control device 54. In this manner, contact (interference) between the heads and disks D can be avoided.

Upon recording/reproduction, the spindle portion 10 is rotated together with the disks D. At this time, the spindle portion 10 that mounts the disks D is brought close to the head stack unit of the rotary alignment control device 54, and each head is aligned to an arbitrary track on the corresponding disk D upon rotation of the rotary alignment control device 54. In this state, servo information such as servo track data or the like is written to produce an information recording medium. In order to confirm the write state, the written information is read out by the identical head. Note that the aforementioned apparatus may be a recording only or reproduction only apparatus.

Since the present invention has the aforementioned arrangement, the following effects are provided.

Whirling vibrations upon rotating the spindle portion that holds a stack of disks and the like are reduced, thus greatly contributing to achievement of high-density, high-speed recording/reproduction.

More specifically, in order to reduce whirling vibrations upon rotating the spindle portion which holds a stack of recording mediums such as disks and the like on its shaft, the lower portion of the spindle portion is rotatably supported by the first fluid bearing, and an aligning member is pressed against the upper end portion of the shaft via the second fluid bearing, thereby preventing axial run-out that causes whirling vibrations.

Upon putting each recording medium on the shaft of the spindle portion, fluid is injected from the air pad, and eccentricity of the recording medium is prevented by that fluid pressure, thus improving dynamic balance of the spindle portion and avoiding whirling vibrations during rotation more reliably.

What is claimed is:

1. A spindle rotation driving device comprising:
    a spindle portion having a shaft for holding a stack of recording mediums;
    a first fluid bearing for rotatably supporting said spindle portion, said first fluid bearing including a fluid film formed between a first porous material surrounding said shaft and said shaft by a fluid injected between said shaft and said porous material;
    a motor for rotating said spindle portion;
    an aligning member pressed against an upper end portion of said shaft in an axial direction, said upper end portion having a second porous material connected thereto; and
    a second fluid bearing including a fluid film formed between said second porous material and said aligning member by a fluid injected from said second porous material, for maintaining said aligning member in a non-contact manner with respect to said upper end portion of said shaft.

2. A device according to claim 1, wherein said aligning member is coupled to a floating plate which is free to float or chucked on a lift stage by a fluid pressure.

3. A device according to claim 1, wherein an air pad for injecting fluid is provided on a cylindrical surface of said shaft, and eccentricity of the recording mediums fitted on said shaft is prevented surrounding the cylindrical surface by a fluid film formed by the fluid.

4. A device according to claim 1, wherein air of said second fluid bearing is supplied from said first fluid bearing via an inner pipe of said shaft.

5. A device according to claim 3, wherein air of said air pad of said shaft is supplied from said first fluid bearing via an inner pipe of said shaft.

6. An information recording/reproduction apparatus for recording/reproducing information on/from a recording medium by a head while rotating the recording medium fitted on a shaft using a spindle rotation driving device according to claim 1.

7. An information recording medium manufacturing method comprising the step of:
    recording servo information on a recording medium by a head while rotating the recording medium fitted on a shaft using a spindle rotation driving device according to claim 1.

* * * * *

UNITED STATES PATENT AND TRADEMARK OFFICE
CERTIFICATE OF CORRECTION

PATENT NO. : 6,704,272 B1
DATED : March 9, 2004
INVENTOR(S) : Hiroyuki Hagiwara

It is certified that error appears in the above-identified patent and that said Letters Patent is hereby corrected as shown below:

Column 3,
Line 27, "helds" should read -- holds --.

Column 4,
Line 51, "rebording/" should read -- recording/ --.

Signed and Sealed this

Twenty-fourth Day of August, 2004

JON W. DUDAS
*Director of the United States Patent and Trademark Office*